(12) United States Patent  
Ikuta et al.

(10) Patent No.: US 10,315,300 B2  
(45) Date of Patent: Jun. 11, 2019

(54) DUST COLLECTING DEVICE AND IMPACT TOOL

(71) Applicant: MAKITA CORPORATION, Anjo-shi, Aichi (JP)

(72) Inventors: Hiroki Ikuta, Anjo (JP); Ken Yamauchi, Anjo (JP); Takamasa Hanai, Anjo (JP); Masao Miwa, Anjo (JP); Tomohiro Ukai, Anjo (JP); Shusaku Wakatsuki, Anjo (JP); Akihiro Ito, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 427 days.

(21) Appl. No.: 15/148,339

(22) Filed: May 6, 2016

(65) Prior Publication Data

US 2016/0250740 A1   Sep. 1, 2016

Related U.S. Application Data

(62) Division of application No. 13/807,844, filed as application No. PCT/JP2011/065309 on Jul. 4, 2011, now Pat. No. 9,440,344.

(30) Foreign Application Priority Data

Jul. 8, 2010   (JP) .................................. 2010-156044

(51) Int. Cl.
*B25D 17/22* (2006.01)
*B23Q 11/00* (2006.01)
(Continued)

(52) U.S. Cl.
CPC .......... *B25D 17/22* (2013.01); *B23Q 11/0046* (2013.01); *B23Q 11/0071* (2013.01);
(Continued)

(58) Field of Classification Search
CPC ............ B23Q 11/0046; B23Q 11/0071; B25D 17/20; B25D 17/22; B25D 2217/0057; B25F 5/026; Y02P 70/171
(Continued)

(56) References Cited

U.S. PATENT DOCUMENTS 1,334,430 A * 3/1920 Ayotte .................... E21B 21/07  
15/409  
2,304,367 A * 12/1942 Meyer ...................... F21L 4/00  
222/175  
(Continued)

FOREIGN PATENT DOCUMENTS

DE   4117496 A1   12/1992  
EP   1974867 A1   10/2008  
(Continued)

OTHER PUBLICATIONS

Oct. 8, 2015 Office Action issued in European Patent Application No. 14176549.5.
(Continued)

*Primary Examiner* — Nathaniel C Chukwurah  
(74) *Attorney, Agent, or Firm* — Oliff PLC

(57) ABSTRACT

A dust collection device, that collects dust particles generated by an impact tool, has a feature that enables the attachment of the device to the impact tool, which is not provided with an attachment section for the device. The dust collection device has a tool body and an auxiliary handle, attached removably to the tool body, and is attached to an electric hammer that, in the lengthwise direction, linearly operates a tool bit mounted to the tip region of the tool body, and collects dust generated by the electric hammer. The dust collection device has: a dust collection unit that has a dust intake port at the tip; a dust collection hose, connected to the dust collection unit, for transferring dust to the downstream side; and a hose-holding unit that holds the dust collection (Continued)

hose. The hose-holding unit can be attached to and removed from the auxiliary handle.

10 Claims, 11 Drawing Sheets

(51) Int. Cl.
    *B25D 17/20*     (2006.01)
    *B25F 5/02*     (2006.01)

(52) U.S. Cl.
    CPC .............. *B25D 17/20* (2013.01); *B25F 5/026* (2013.01); *B25D 2217/0057* (2013.01); *Y02P 70/171* (2015.11)

(58) Field of Classification Search
    USPC ......................................... 173/198, 217, 171
    See application file for complete search history.

(56) References Cited

U.S. PATENT DOCUMENTS

| | | | |
|---|---|---|---|
| 3,245,483 A | | 4/1966 | Etzkorn |
| 4,097,176 A | * | 6/1978 | Wanner ................ B23Q 1/0036 |
| | | | 175/213 |
| 4,179,805 A | * | 12/1979 | Yamada .............. B27B 17/0008 |
| | | | 172/41 |
| 4,207,953 A | * | 6/1980 | Reibetanz ............. B23B 49/006 |
| | | | 173/21 |
| 4,317,282 A | * | 3/1982 | Pace .................... A01D 34/412 |
| | | | 173/170 |
| 4,479,599 A | * | 10/1984 | Conrad ..................... B25C 1/18 |
| | | | 227/156 |
| 5,070,576 A | * | 12/1991 | Banta ..................... A01G 3/053 |
| | | | 16/427 |
| 5,090,499 A | * | 2/1992 | Cuneo ................ B23Q 11/0046 |
| | | | 173/75 |
| 5,129,467 A | * | 7/1992 | Watanabe .......... B23Q 11/0046 |
| | | | 173/217 |
| 6,557,739 B1 | * | 5/2003 | Pursley ..................... A45F 5/00 |
| | | | 224/234 |
| 2007/0261195 A1 | | 11/2007 | Bleicher et al. |

FOREIGN PATENT DOCUMENTS

| | | |
|---|---|---|
| FR | 2702171 A1 | 9/1994 |
| GB | 1 569 532 A | 6/1980 |
| JP | 3-124805 U | 12/1991 |
| JP | 4-109840 U | 9/1992 |
| JP | 2005-305577 A | 11/2005 |
| JP | 2007-303271 A | 11/2007 |
| WO | 2012/005224 A1 | 1/2012 |

OTHER PUBLICATIONS

Jan. 21, 2016 Office Action Issued in U.S. Appl. No. 13/807,844.
Jun. 16, 2015 Office Action issued in Russian Patent Application No. 2013105333.
Jul. 27, 2015 Office Action issued in Chinese Patent Application No. 201180033723.6.
May 26, 2014 Office Action issued in European Patent Application No. 11803558.3.
Nov. 20, 2014 Office Action issued in European Patent Application No. 11803558.3.
Feb. 4, 2015 Office Action issued in Chinese Patent Application No. 201180033723.6.
Sep. 12, 2014 Search Report issued in European Patent Application No. 14176549.5.
Oct. 22, 2013 Search Report issued in European Patent Application No. 11803558.3.
Feb. 12, 2013 International Preliminary Report on Patentability issued in International Patent Application No. PCT/JP2011/065309.
Sep. 27, 2011 International Search Report issued in International Patent Application No. PCT/JP2011/065309.
U.S. Appl. No. 13/807,844, filed Mar. 15, 2013 in the name of Ikuta et al.

* cited by examiner

DUST COLLECTING DEVICE AND IMPACT TOOL

This is a Division of U.S. application Ser. No. 13/807,844 filed Mar. 15, 2013, which is a U.S. National Phase of International Application No. PCT/JP2011/065309 filed Jul. 4, 2011, which claims the benefit of Japanese Application No. 2010-156044 filed Jul. 8, 2010. The disclosures of the prior applications are hereby incorporated by reference herein in their entireties.

FIELD OF THE INVENTION

The invention relates to a dust collecting device for collecting dust generated by an impact tool, and an impact tool having the dust collecting device.

BACKGROUND OF THE INVENTION

In an impact tool which performs a hammering operation or a hammer drill operation by a tool bit on a workpiece such as concrete, dust is generated during operation. Therefore, some conventional impact tools are provided with a dust collecting device for collecting dust generated during operation. For example, Japanese non-examined laid-open Patent Publication No. 2007-303271 discloses a dust collecting device having a cylindrical hood which is arranged to surround a tool bit. In this dust collecting device, dust generated by operation is sucked up through a front end opening of the hood and collected via a dust collecting hose.

The above-described known impact tool has a mounting part for mounting a dust collecting device on its tool body side. Therefore, the dust collecting device cannot be attached to an impact tool having no mounting part for mounting the dust collecting device.

DISCLOSURE OF THE INVENTION

Problems to be Solved by the Invention

It is, accordingly, an object of the present invention to provide a technique for attaching a dust collecting device to an impact tool having no mounting part for the dust collecting device, in the dust collecting device for collecting dust generated by the impact tool.

Means for Solving the Problem

In order to solve the above-described problem, in a preferred embodiment according to the present invention, a dust collecting device is provided which is attached to an impact tool and collects dust generated by the impact tool. The impact tool includes a tool body and an auxiliary handle removably mounted to the tool body, and in the impact tool, a tool bit coupled to a front end region of the tool body is caused to rectilinearly move in an axial direction of the tool bit. The dust collecting device includes a dust collecting part having a dust suction port at its front end, a dust collecting hose which is connected to the dust collecting part and through which dust is transferred downstream, and a hose holding part for holding the dust collecting hose. Further, the hose holding part can be mounted to and removed from the auxiliary handle. The manner in which "the hose holding part can be mounted to and removed from the auxiliary handle" in this invention suitably includes the manner in which the hose holding part can be mounted to and removed from the tool body together with the auxiliary handle when the auxiliary handle is mounted to and removed from the tool body, and the manner in which the hose holding part can be mounted to and removed from the auxiliary handle mounted to the tool body.

According to this invention, the dust collecting device can be attached to the impact tool via the auxiliary handle. Therefore, the dust collecting device can be attached to an existing impact tool having no mounting part for the dust collecting device. Further, the impact tool is not provided as a special tool having a dust collecting device.

According to a further embodiment of this invention, the auxiliary handle includes a ring-like mounting part which can hold the tool body from outside, a base formed on the mounting part, a rod-like grip to be held by a user, and an arm extending from the grip in a direction transverse to a longitudinal direction of the grip and having an extending end. The base and the extending end are arranged in parallel to the longitudinal direction of the grip and clamped by using a bolt extending therethrough and a nut threadingly engaged with the bolt, so that the mounting part holds the tool body. Further, the hose holding part is mounted to the tool body together with the auxiliary handle by the clamping with the bolt and the nut. The manner in which "the hose holding part is mounted to the tool body together with the auxiliary handle by clamping using the bolt and the nut" in this invention typically refers to the manner in which part of the hose holding part is held between two members, such as between a head of the bolt and the arm, between the arm and the base, and between a pair of bases if the base is provided in a pair.

According to this invention, the hose holding part can be mounted by utilizing the bolt and the nut provided as means for mounting the auxiliary handle to the tool body, so that the dust collecting device can be attached to the impact tool in a rational manner.

According to a further embodiment of this invention, the auxiliary handle includes an elongate grip, and a plurality of opposed arms extending from the grip in a direction transverse to a longitudinal direction of the grip. Further, the hose holding part is disposed between the opposed arms and includes a telescopic mounting member which can extend and retract in a direction transverse to the extending direction of the arms, and the mounting member is secured to the arms under tension by a biasing force acting thereon in its extending direction so that the hose holding part is mounted to the auxiliary handle.

According to this invention, with the construction in which the hose holding part is mounted to the auxiliary handle by securing the mounting member between the opposed arms under tension, the hose holding part can be easily mounted and removed with the auxiliary handle left mounted to the tool body.

According to a different embodiment of this invention, a dust collecting device is attached to an impact tool and collects dust generated by the impact tool in which a tool bit coupled to a front end region of the tool body is caused to rectilinearly move in an axial direction of the tool bit. The dust collecting device includes a dust collecting part having a dust suction port through which dust is sucked up, a dust collecting hose which is connected to the dust collecting part and through which dust is transferred downstream, and a hose holding part for holding the dust collecting hose. Further, the hose holding part is mounted to the tool body by a wrapping member which is detachably wrapped around the tool body. The "wrapping member" in this invention suitably includes a flexible band-like member such as a belt, a band and a tape and a flexible string-like member such as a rope and a ball chain.

According to this invention, by wrapping the wrapping member around the tool body, the hose holder can be mounted to the tool body, so that the dust collecting device can be attached to the impact tool. Therefore, the dust collecting device can be easily attached to an existing impact tool having no mounting part for the dust collecting device. Further, the impact tool is not provided as a special tool having a dust collecting device According to a further embodiment of this invention, an impact tool having the dust collecting device as defined in any one of claims 1 to 4 is provided. Thus, the impact tool can be provided with the dust collecting device which can be easily attached to an existing impact tool having no mounting part for the dust collecting device.

Effect of the Invention

According to this invention, in a dust collecting device for collecting dust generated by an impact tool, a technique is provided for attaching a dust collecting device to an existing impact tool having no mounting part for the dust collecting device.

Other objects, features and advantages of the present invention will be readily understood after reading the following detailed description together with the accompanying drawings and the claims.

REPRESENTATIVE EMBODIMENT OF THE INVENTION

Each of the additional features and method steps disclosed above and below may be utilized separately or in conjunction with other features and method steps to manufacture and use improved dust collecting devices and impact tools and methods for using them and devices utilized therein. Representative examples of the present invention, which examples utilized many of these additional features and method steps in conjunction, is now described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment of the Invention

Figure 1:
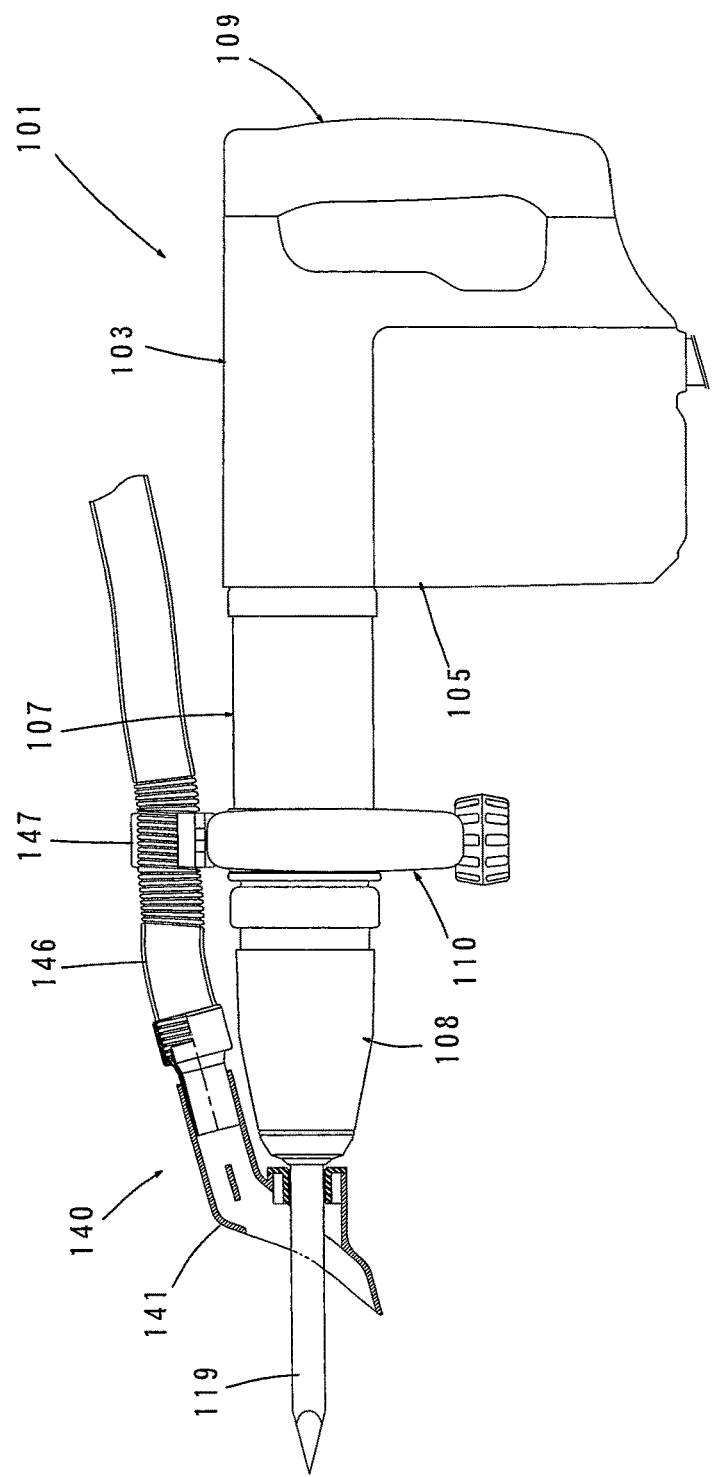
FIG. 1 is an external view showing an entire electric hammer with a dust collecting device according to a first embodiment of the present invention.

A dust collecting device according to a first embodiment of the present invention is now described with reference to FIGS. 1 to 7. This embodiment is explained as being applied to an electric hammer as a representative example of an impact tool. FIG. 1 shows an electric hammer 101 having an auxiliary handle in the form of a side handle 110 mounted thereon and a dust collecting device 140 attached to the side handle 110. The construction of the electric hammer 101 is now briefly explained with reference to FIG. 1. The hammer 101 mainly includes a body 103 that forms an outer shell of the hammer 101, an elongate hammer bit 119 detachably coupled to the front end region (on the left side as viewed in FIG. 1) of the body 103 via a tool holder (not shown), and a main handle in the form of a handgrip 109 connected to the body 103 on the side opposite to the hammer bit 119 and designed to be held by a user. The body 103 and the hammer bit 119 are features that correspond to the "tool body" and the "tool bit", respectively, according to the present invention. The hammer bit 119 is held by the tool holder via a chuck 108 such that it is allowed to reciprocate with respect to the tool holder in its axial direction and prevented from rotating with respect to the tool holder in its circumferential direction. For the sake of convenience of explanation, in the hammer 101, the side of the hammer bit 119 is taken as the front and the side of the main handle 109 as the rear.

The body 103 mainly includes a housing 105 and a generally cylindrical barrel 107 connected to the front of the housing 105. The body 103 houses a driving motor, a motion converting mechanism in the form of a crank mechanism which converts rotation of the driving motor into linear motion, and a striking mechanism which is driven by the crank mechanism and includes a striker (striking element) for striking the hammer bit 119 in the axial direction and an impact bolt (intermediate element) for transmitting the striking movement of the striker to the hammer bit 119.

In the hammer 101 constructed as described above, when the driving motor is driven, a striking force is applied to the hammer bit 119 in the axial direction from the crank mechanism via the striking mechanism. Thus, the hammer bit 119 performs an operation (chipping operation) on a workpiece (concrete) by a hammering movement in the axial direction.

Figure 4:
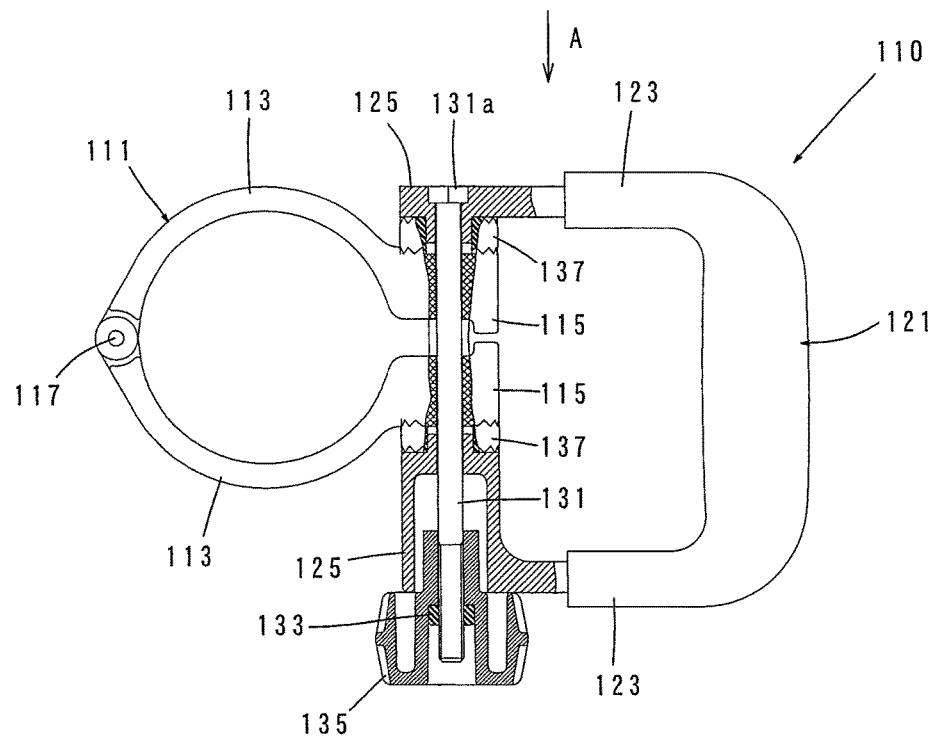
FIG. 4 is a partially sectional view showing the entire structure of a side handle.
Figure 5:
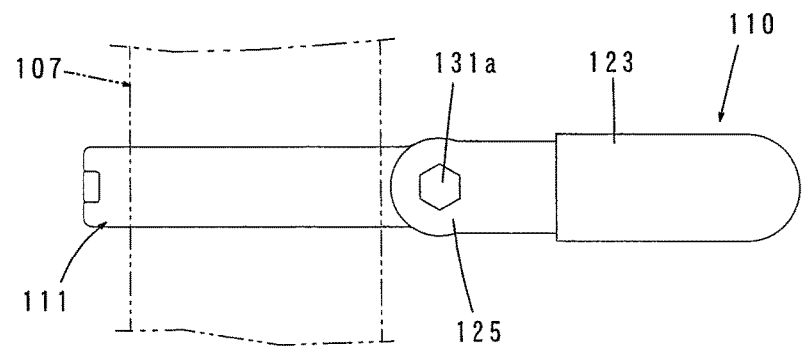
FIG. 5 is a view in the direction of arrow A in FIG. 4.

The auxiliary handle in the form of the side handle 110 to which the dust collecting device 140 is attached is now explained with reference to FIGS. 4 and 5. The side handle 110 is detachably mounted onto the barrel 107 of the hammer 101. The side handle 110 mainly includes a mounting ring 111 which is mounted onto the generally cylindrical barrel 107 by holding the outer circumferential surface of the barrel 107 from the outside, a grip 121 connected to the mounting ring 111 and designed to be held by a user, and a fastening means which includes a through bolt 131 and a fastening knob 135 with a nut 133 and serves to clamp and loosen the mounting ring 111.

The mounting ring 111 includes a pair of upper and lower generally semi-circular arc ring components 113. The pair ring components 113 are rotatably connected at one end with respect to each other via a shaft 117 which extends parallel to the longitudinal direction of the barrel 107. An outwardly protruding base 115 is formed on the other free end of each of the ring components 113.

The grip 121 has a rod-like shape having a generally circular section and has upper and lower arms 123 which extend parallel to each other from the both ends of the grip 121 in the longitudinal direction (the vertical direction as viewed in FIG. 4) toward the mounting ring 111. The bases 115 of the mounting ring 111 are disposed between extending end portions 125 of the upper and lower arms 123 via ring-like cams 137. The through bolt 131 is loosely inserted in the vertical direction through holes formed in the extending end portions 125, the cams 137 and the bases 115. The through bolt 131 has a hexagonal head 131a on one end, and the head 131a engages with an upper surface (bottom of a counterbore) of the extending end portion 125 of the upper arm 123. The other end of the through bolt 131 protrudes a predetermined distance from the extending end portion 125 of the lower arm 123. The nut 133 of the fastening knob 135 is threadingly engaged with a threaded portion of the through bolt 131.

In the side handle 110 constructed as described above, when the mounting ring 111 is loosely fitted onto the barrel 107 and the fastening knob 135 is turned in one direction (tightening direction), the upper and lower extending end portions 125 are clamped (pressed) and moved (deformed), due to elasticity of the arms 123, in a direction that lessens a distance therebetween (toward each other) by using the through bolt 131 and the fastening knob 135 (the nut 133). As a result, the bases 115 are also moved toward each other via the upper and lower cams 137 in a direction that lessens the ring diameter of the ring components 113. Thus, the mounting ring 111 is clamped onto the barrel 107.

When the fastening knob 135 is turned in the other direction (loosening direction), the upper and lower extending end portions 125 and the bases 115 clamped by the through bolt 131 and the fastening knob 135 are released and return to their initial position in which they are not yet clamped, so that the mounting ring 111 is unclamped from the barrel 107. In this state, the side handle 110 can be removed from the barrel 107.

The dust collecting device 140 is now explained with reference to FIGS. 1 to 3. The dust collecting device 140 is attached to the side handle 110 and serves to suck up and collect dust generated during operation on a workpiece. The dust collecting device 140 according to this embodiment mainly includes a resin or rubber dust collecting hood 141 for collecting dust, a dust collecting hose 146 for transferring dust downstream from the dust collecting hood 141, and a hose holder 147 for holding the dust collecting hose 146. The dust collecting hood 141, the dust collecting hose 146 and the hose holder 147 are features that correspond to the "dust collecting part", the "dust transfer part" and the "hose holding part", respectively, according to the present invention.

Figure 2:
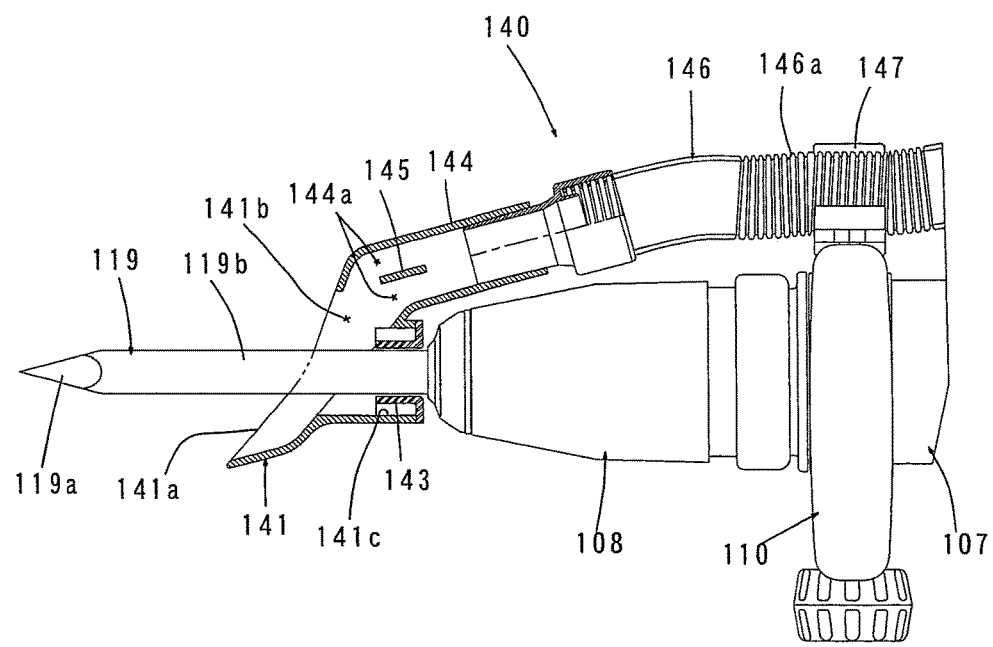
FIG. 2 is a sectional view showing the entire structure of the dust collecting device.
Figure 3:
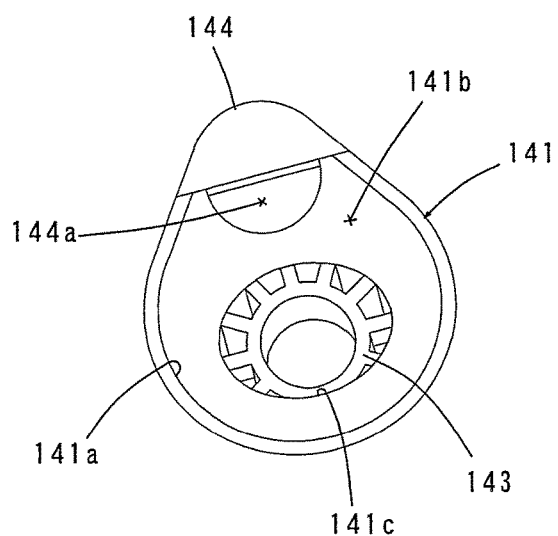
FIG. 3 is a front view showing the configuration of a front end of a dust collecting hood.

As shown in FIGS. 2 and 3, the dust collecting hood 141 is a generally cup-like member (generally cylindrical member with a bottom) which is arranged to surround the hammer bit 119 entirely around its axis with a predetermined clearance in the radial direction and has an internal space 141b with an open front end formed as a dust suction port 141a. On its bottom (on the side opposite from the dust suction port 141a), the dust collecting hood 141 has a through hole 141c extending in the axial direction of the hammer bit and formed for mounting a cylindrical sliding member 143 therein, and a hose connecting part 144 formed adjacent to the through hole 141c.

The cylindrical sliding member 143 is a guiding member for the dust collecting hood 141 and has a bore which is slidably fitted onto a shank 119b of the hammer bit 119. The cylindrical sliding member 143 is detachably fitted in the through hole 141c of the dust collecting hood 141. The dust suction port 141a of the dust collecting hood 141 is disposed at a predetermined distance away from a bit tip 119a of the hammer bit 119 by fitting the cylindrical sliding member 143 onto the hammer bit 119 from the front. The bore inner wall surface of the cylindrical sliding member 143 is slidably engaged with the outer surface of the shank of the hammer bit 119. Thus, the dust collecting hood 141 is held on the shank 119b of the hammer bit 119, while being allowed to move in the axial direction with respect to the hammer bit 119 via the cylindrical sliding member 143.

The hose connecting part 144 has an open front end formed as a dust inlet into the internal space 141b of the dust collecting hood 141. The hose connecting part 144 extends rearward to a predetermined length along the outer contour (tapered cylindrical shape) of the chuck 108. The hose connecting part 144 has an open rear end formed as a dust outlet, and the dust collecting hose 146 is detachably inserted in and connected to the dust outlet. Further, a partition 145 is formed in a front end region of the hose connecting part 144 and serves to partition a passage of the hose connecting part 144 into several parts. The hose connecting part 144 is partitioned into passages 144a by the partition 145 such that the flow passage sectional area of each passage 144a is smaller than the minimum flow passage sectional area of the dust collecting hose 146. With this construction, a large piece of dust (chip) is blocked by the partition 145 and prevented from entering the dust collecting hose 146, so that clogging of the hose can be avoided.

As shown in FIG. 3, the dust collecting hood 141 has a generally elliptical shape in front view (when viewed from the bit tip of the hammer bit 119). Further, as shown in FIG. 2, the front end region (the dust suction port 141a side) of the dust collecting hood 141 includes a region on a connecting part side for connection with the dust collecting hose 146 and a region on the opposite side of the hammer bit 119 from the connecting part side. The front end region of the dust collecting hood 141 is inclined such that it extends away from the bit tip 119a of the hammer bit 119 on the hose connecting part 144 side, while extending toward the bit tip on the opposite side. Specifically, the front end region of the dust collecting hood 141 has a circumferential shape inclined with respect to the axial direction of the hammer bit 119 such that the region on the hose connecting part 144 side extends away from the bit tip 119a. With this configuration, visibility of the bit tip 119a (a work area of the workpiece) can be improved when it is viewed over the hose connecting part 144, and dust sucked up into the dust collecting hood 141 can be smoothly led into the hose connecting part 144.

The dust collecting hose 146 is a tubular member made of rubber or resin and having a bellows-like part 146a formed at least in part of the dust collecting hose 146. The dust collecting hose 146 is connected to the dust collecting hood 141 by inserting one (front) end of the dust collecting hose 146 into the dust outlet of the hose connecting part 144. The dust collecting hose 146 extends along the body 103 of the hammer 101 generally in the axial direction of the hammer bit 119 and is held on the barrel 107 via the side handle 110 by the hose holder 147. Further, the dust collecting hose 146 is connected to a dust collector (not shown) at least during operation. In this manner, the dust collecting device 140 of this embodiment is constructed to be held on the hammer 101 at two points in the longitudinal direction such that the dust collecting hose 146 is held on the body 103 and the dust collecting hood 141 is held on the hammer bit 119. Further, in this embodiment, the dust collecting hose 146 is connected to a dust collector formed separately from the hammer 101, but it may be connected otherwise. For example, if the hammer 101 has a suction device including a motor and a motor-driven dust collecting fan, or if the dust collecting device itself has a suction device including a motor and a motor-driven dust collecting fan, the dust collecting hose 146 may be connected to the suction device.

Figure 6:
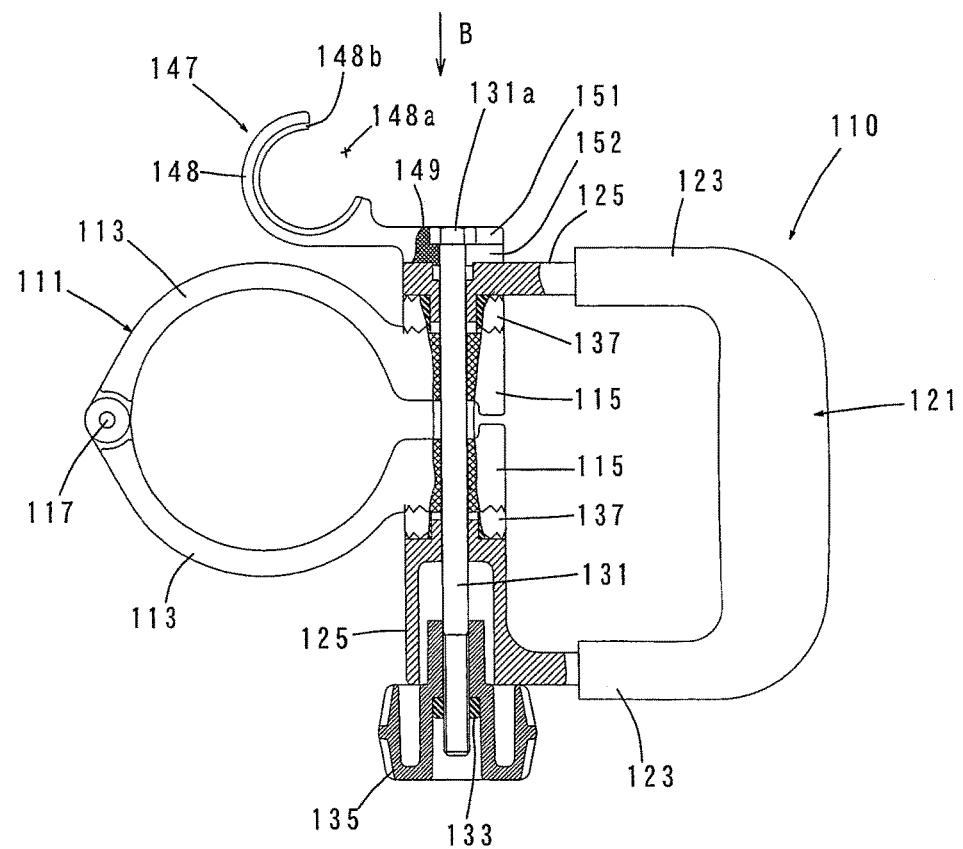
FIG. 6 is a partially sectional view showing a structure of mounting the dust collecting device or particularly a hose holder to the side handle.
Figure 7:
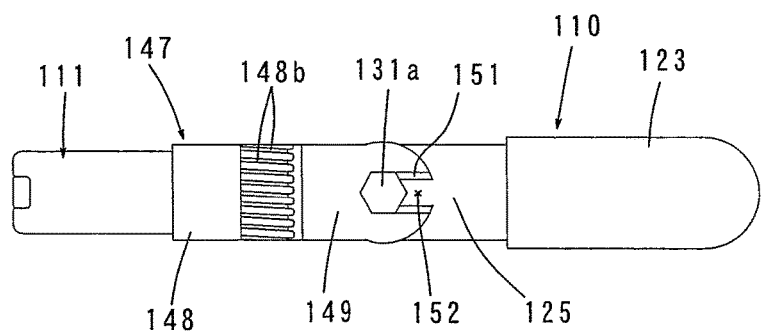
FIG. 7 is a view in the direction of arrow B in FIG. 6.

As shown in FIGS. 6 and 7, the hose holder 147 has a hose holder body 148 for holding the dust collecting hose 146 and a plate-like mounting base 149 extending from the hose holder body 148. The hose holder body 148 is a generally circular ring-like member having a hose attachment/removal opening 148a. A plurality of circumferentially extending rib-like projections 148b are formed on an inner circumferential surface of the hose holder body 148 and can engage with valleys of the bellows-like part 146a of the dust collecting hose 146. The opening width of the hose attachment/removal opening 148a in the circumferential direction is slightly smaller than the hose diameter. Therefore, in order to attach and remove the hose with respect to the hose holder body 148 through the opening 148a, the bellows-like part 146a is deformed into a generally elliptical form. The dust collecting hose 146 held by the hose holder body 148 is locked against axial movement by engagement between the projections 148a and the valleys of the bellows-like part 146a.

The mounting base 149 is inserted between a head 131a of the through bolt 131 and the upper arm 123 of the grip 121 in the side handle 110 and fastened to the side handle 110. The mounting base 149 can be removed from the side handle 110 when the through bolt 131 is loosened. For this purpose, as shown in FIGS. 6 and 7, the mounting base 149 has a notch 151 and a recessed engagement part 152. The notch 151 is generally U-shaped in planar view and can be fitted onto the through bolt 131 from a radial direction. The recessed engagement part 152 is formed along a peripheral edge of an upper surface of the notch 151, engaged with the head 131a of the through bolt 131 fitted in the notch 151 and locked against rotation relative to the head 131a. Therefore, when the through bolt 131 is loosened, the hose holder 147 can be turned about 360 degrees around the through bolt 131, so that its position can be adjusted around the bolt axis. When the through bolt 131 is tightened by turning the fastening knob 135 after the hose holder 147 is set in a predetermined position around the through bolt 131, the through bolt 131 engaged at the head 131a with the recessed engagement part 152 and locked against rotation is moved toward the fastening knob 135. In this manner, the mounting base 149 is fastened to the side handle 110 between the head 131a of the through bolt 131 and the upper arm 123.

The dust collecting device 140 according to this embodiment is constructed as described above. When a dust collector is driven and the hammer 101 is driven to perform a chipping operation on a workpiece by linear hammering movement of the hammer bit 119, the dust collecting device 140 can collect dust generated during the operation. Specifically, dust generated by the hammer 101 is sucked up into the dust collecting hood 141 through the dust suction port 141a and collected in the dust collector via the hose connecting part 144 of the dust collecting hood 141 and the dust collecting hose 146.

In chipping operation, hammer bits 119 of different lengths are used according to the operation conditions. In consideration of this, in this embodiment, the position of the front end of the dust collecting hood 141 (the position of the dust suction port 141a) can be adjusted with respect to the hammer bit 119 by changing the position of the hose holder 147 for holding the dust collecting hose 146. Thus, the dust suction port 141a can be positioned at an adequate distance from the bit tip of the hammer bit 119 to be used. As a result, such a problem that the dust collecting efficiency is reduced by increase of the distance between the dust suction port 141a and a dust generation area can be eliminated. According to this embodiment, the hammer bits 119 having different lengths can be accommodated without reducing the dust collecting ability, and a plurality of dust collecting hoods 141 are not needed.

Further, the hammer bits 119 are available in several types varying in length and in several types varying in the diameter of the shanks 119b. In consideration of this, in this embodiment, the cylindrical sliding member 143 is detachably fitted in the through hole 141c of the dust collecting hood 141. Further, a plurality of cylindrical sliding members 143 having bores of different diameters are provided to accommodate a plurality of hammer bits 119 having the shanks 119b of different diameters. Thus, the cylindrical sliding members 143 can be replaced and mounted in the through hole 141c of the dust collecting hood 141 in order to accommodate the hammer bits 119 having the shanks 119b of different diameters.

Further, in this embodiment, the dust collecting hose 146 can be attached to and removed from the hose holder body 148 through the hose attachment/removal opening 148a, and the dust collecting hose 146 is locked against axial movement and held by engagement between the rib-like projections 148b of the hose holder body 148 and the valleys of the bellows-like part 146a of the dust collecting hose 146. With this construction, the front end position of the dust collecting hood 141 can be easily adjusted by changing the position of engagement of the bellows-like part 146a with respect to the projections 148a when attaching the dust collecting hose 146. Further, with the construction in which the dust collecting hose 146 is locked against axial movement by engagement between the rib-like projections 148a and the valleys of the bellows-like part 146a, the dust collecting hood 141 can be prevented from being displaced by vibration during chipping operation so that it can be reliably and securely held in position.

Further, in this embodiment, the sleeve-like cylindrical sliding member 143 is provided on part of the dust collecting hood 141 and slidably fitted onto the shank 119b of the hammer bit 119, and the dust collecting hood 141 is directly guided by the shank 119b of the hammer bit 119. With this construction, the dust collecting hood 141 can be held with stability. Further, by provision of the holding stability, the dust collecting hood 141 can be placed closer to an area of dust generation or the tip of the hammer bit 119, so that the dust collecting efficiency can be improved.

Further, in this embodiment, the front end region of the dust collecting hood 141 is inclined with respect to the axis of the hammer bit 119. Therefore, when a chipping operation is performed, for example, on a vertical wall, part (the dust collecting hose connection side) of the circumferential region of the dust collecting hood 141 which extends away from the bit tip 119a is set to be positioned in the line of sight, or between a user's eye and a work area of the workpiece during operation, so that visibility of the work area of the workpiece can be improved when the work area is viewed over the dust collecting hood 141. Further, part of the circumferential region of the dust collecting hood 141 which extends toward the bit tip 119a is placed below the hammer bit 119. With this construction, the dust suction port 141a can more easily catch chips which are scattered during chipping operation.

Further, in this embodiment, the dust collecting hood 141 has a generally cup-like shape and is arranged to surround the shank 119b entirely around its axis at a distance away from the bit tip 119a of the hammer bit 119. With this construction, the dust collecting hood 141 can be made smaller, and visibility of the work area can be improved.

Further, in this embodiment, the mounting base 149 of the hose holder 147 can be inserted between the head 131a of the through bolt 131 and the upper arm 123 of the grip 121 in the side handle 110 and clamped to the side handle 110. The mounting base 149 can be removed from the side handle 110 by loosening the through bolt 131. Specifically, according to this embodiment, when the side handle 110 is mounted to the body 103, the hose holder 147 for holding the dust collecting hose 146 of the dust collecting device 140 can be mounted to the body 103 of the electric hammer 101 together with the side handle 110. Therefore, even if the hammer 101 is not provided with a mounting part for the dust collecting device 140, the dust collecting device 140 can be attached to the hammer 101. Further, with the construction in which the hose holder 147 is clamped by utilizing the through bolt 131 and the nut 133 provided as means for mounting the side handle 110 to the body 103, the dust collecting device 140 can be easily attached, and not only the body 103 but the side handle 110 does not need its structural change for such mounting.

Figure 8:
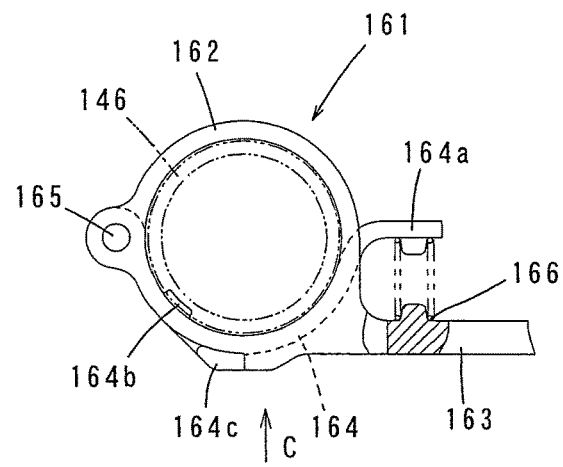
FIG. 8 is a front view showing a modification of a hose holder for holding a dust collecting hose, when the dust collecting hose is locked against movement.
Figure 9:
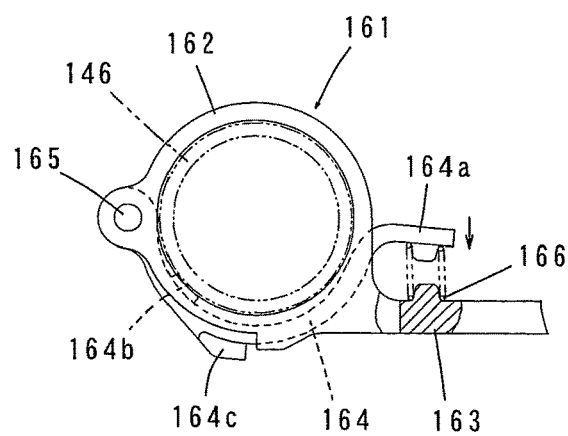
FIG. 9 is a front view also showing the modification of the hose holder when the dust collecting hose is unlocked.
Figure 10:
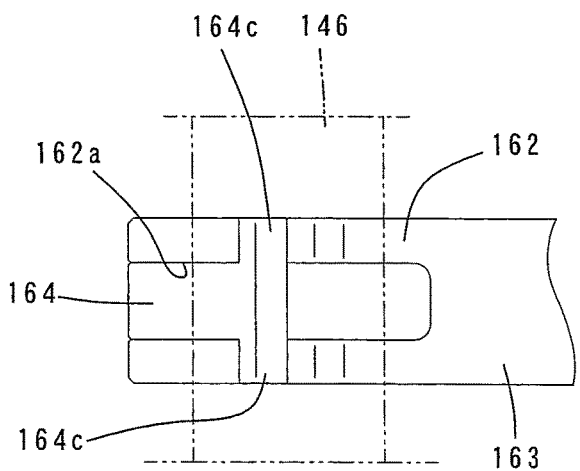
FIG. 10 is a view in the direction of arrow C in FIG. 8.

A modification in relation to a structure of holding the dust collecting hose 146 of the dust collecting device 140 is now described with reference to FIGS. 8 to 10. This modification is a modification to the hose holder 147, which is described in the first embodiment, for holding the dust collecting hose 146 of the dust collecting device 140. The entire construction of the dust collecting device 140 other than the hose holder is the same as in the first embodiment.

A hose holder 161 of this modification mainly includes an annular hose holder body 162 which serves to hold the dust collecting hose 146 and through which the dust collecting hose 146 can be inserted, a plate-like mounting base 163 extending from the hose holder body 162, and a semicircular locking member 164 for locking the dust collecting hose 146 to the hose holder body 162. The hose holder 161 is a feature that corresponds to the "hose holding part" according to this invention.

The hose holder body 162 is a circular ring-like member having an inner diameter slightly larger than the outer diameter of the bellows-like part 146a of the dust collecting hose 146. The hose holder body 162 has an opening 162a (see FIG. 10) formed in the middle in its axial direction and extending over a predetermined area (of about 180 degrees) in the circumferential direction. The locking member 164 has a generally semi-circular arc shape having about the same radius of curvature as the inner diameter of the hose holder body 162, and is disposed in the opening 162a of the hose holder body 162. One end of the locking member 164 is rotatably connected to the hose holder body 162 by a pin 165. At the other end, the locking member 164 has a protruding end 164a protruding radially outward of the hose holder body 162. The protruding end 164a faces an upper surface of the mounting base 163. One or more locking projections 164b are formed on the inner surface of the locking member 164 and protrude radially inward. The locking projections 164b are engaged with the valleys of the bellows-like part 146a of the dust collecting hose 146 so that the dust collecting hose 146 is locked against axial movement with respect to the hose holder body 162. This state is shown in FIG. 8.

A compression coil spring 166 is disposed as a biasing member between the mounting base 163 and the protruding end 164a which face each other. Thus, the locking member 164 is biased to turn radially inward such that the locking projections 164b are engaged with the valleys of the bellows-like part 146a of the dust collecting hose 146. Therefore, the locking projections 164b and the valleys of the bellows-like part 146a are held in engagement and the dust collecting hose 146 is locked against axial movement. The locking member 164 has a stopper 164c for defining the limit to which the locking member 164 can be turned radially inward by the compression coil spring 166. The stopper 164c is formed as a projection extending in the axial direction on the outer circumferential surface of the locking member 164. When the locking member 164 is turned radially inward, the stopper 164c comes into contact with the outer surface of the hose holder body 162 and prevents the locking member 164 from being further turned.

Further, the protruding end 164a of the locking member 164 forms an operation knob. When the protruding end 164a is pressed against the biasing force of the compression coil spring 166, the locking member 164 is turned radially outward on the pin 165. Thus, the locking projections 164b are disengaged from the bellows-like part 146a, so that the dust collecting hose 146 is allowed to move in the axial direction. This state is shown in FIG. 9.

According to this embodiment constructed as described above, after the protruding end 164a of the locking member 164 is pressed and the locking projections 164b are disengaged from the bellows-like part 146a of the dust collecting hose 146, the position of the front end of the dust collecting hood 141 can be adjusted with respect to the hammer bit 119 by moving the dust collecting hose 146 in the axial direction. Once the dust collecting hood 141 is positioned, engagement between the bellows-like part 146a and the locking projections 164b is maintained by the compression coil spring 166. Therefore, there exists no risk that the dust collecting hood 141 is unintentionally displaced due to vibration caused by the operation.

Modifications to a mounting structure for mounting the dust collecting device 140 to the side handle 110, or particularly to a mounting structure for mounting the hose holder 147 are now described with reference to FIGS. 11 to 20.

Figure 11:
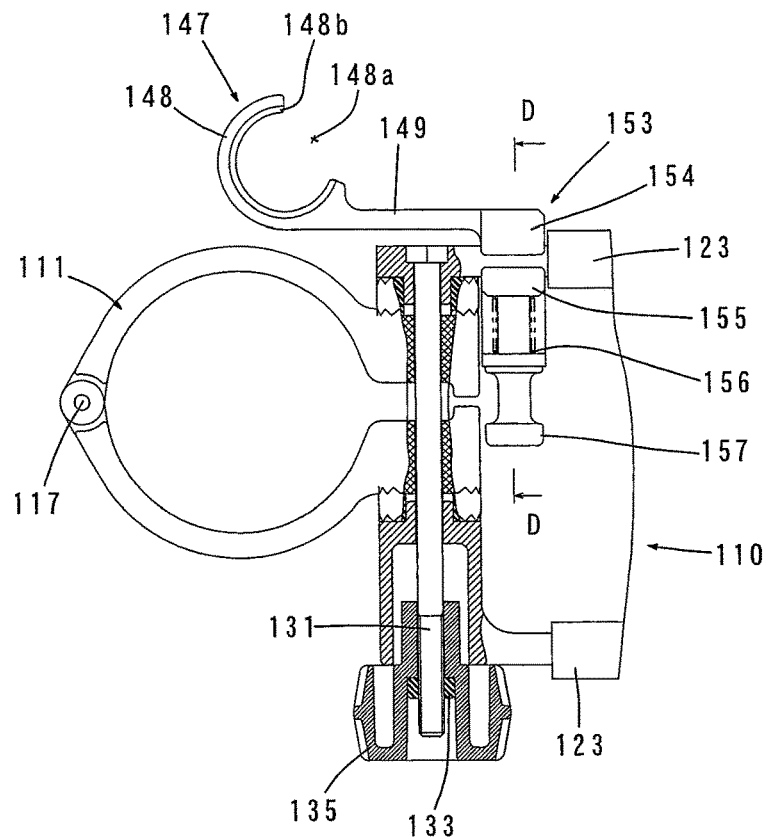
FIG. 11 is a partially sectional view showing a modification of a structure of mounting the dust collecting device or particularly the hose holder to the side handle.
Figure 12:
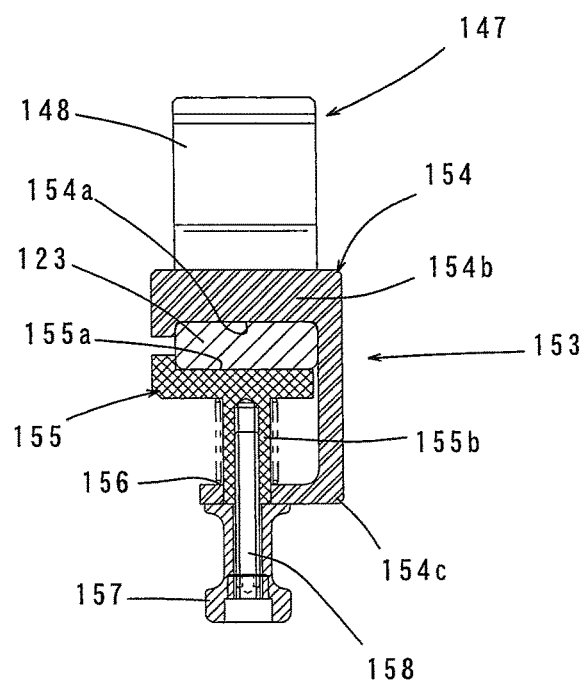
FIG. 12 is a sectional view taken along line D-D in FIG. 11 and showing the hose holder mounted to the side handle.
Figure 13:
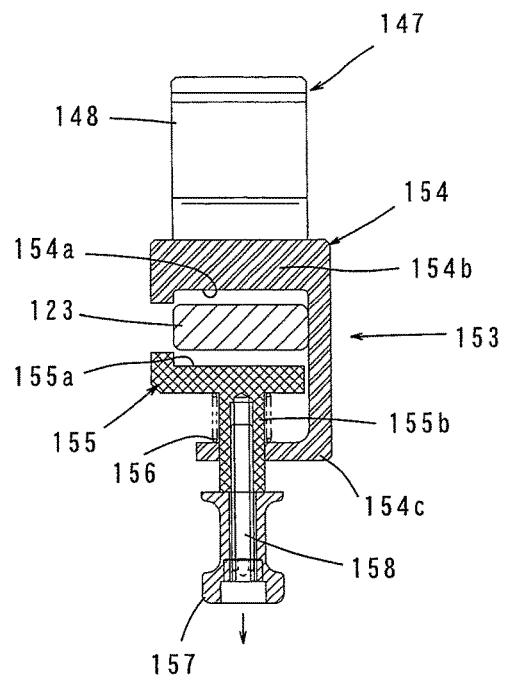
FIG. 13 is also a sectional view taken along line D-D in FIG. 11 and showing the hose holder in the process of mounting (removing) the side handle.

First, a modification shown in FIGS. 11 to 13 is explained. In this modification, the hose holder 147 is mounted to the side handle 110 via a clamping mechanism 153 provided on the mounting base 149. The clamping mechanism 153 is secured to the side handle 110 by clamping the upper arm 123 of the side handle 110 from above and below. The dust collecting device 140 has the same construction as in the first embodiment, and only part of the dust collecting device 140 or the hose holder 147 is shown in FIGS. 11 to 13.

The clamping mechanism 153 mainly includes a fixed clamp arm 154 and a movable clamp arm 155 which have respective clamp faces 154a, 155a facing each other, a clamping biasing member in the form of a compression coil spring 156 which constantly biases the movable clamp arm 155 toward the fixed clamp arm 154, and an unclamping operation member 157 for moving the movable clamp arm 155 away from the fixed clamp arm 154.

The fixed clamp arm 154 is integrally formed with the mounting base 149 of the hose holder 147. As shown in FIGS. 12 and 13, the fixed clamp arm 154 includes a clamp part 154b having a lower surface with the clamp face 154a, and an arm guide part 154c which extends downward from one end of the clamp part 154b and is wrapped around to the back (underside) of the clamp face 155a of the movable clamp arm 155. The movable clamp arm 155 is disposed below the clamp face 154a. The movable clamp arm 155 has a guide rod 155b integrally formed on its back side opposite from the clamp face 155a, and the guide rod 155b is slidably inserted in a guide hole of the arm guide part 154c.

The compression coil spring 156 is disposed around the guide rod 155b between the arm guide part 154c and the movable clamp arm 155 and biases the movable clamp arm 155 toward the fixed clamp arm 154. The operation member 157 is formed by a knob which is fastened to the lower end of the guide rod 155b by a screw 158.

The hose holder 147 is mounted to the side handle 110 by the clamping mechanism 153. Specifically, as shown in FIG. 13, the operation member 157 is pulled down so that the movable clamp arm 155 is moved away from the fixed clamp arm 154. In this state, the upper arm 123 of the side handle 110 is placed between the movable clamp arm 155 and the fixed clamp arm 154 and the operation member 157 is released. Thus, as shown in FIG. 12, the movable clamp arm 155 is moved toward the fixed clamp arm 154 by the biasing force of the compression coil spring 156, and the arm 123 is clamped by the clamp faces 154a, 155a. In this manner, the hose holder 147 can be mounted to the side handle 110.

According to this modification in which the hose holder 147 can be mounted to the side handle 110 by using the clamping mechanism 153, like in the first embodiment, the dust collecting device 140 can be attached via the side handle 110 to the electric hammer 101 having no mounting part for the dust collecting device 140. Further, the hose holder 147 can be mounted to and removed from the side handle 110 by simple operation of pulling and releasing the operation member 157. Thus, workability in attaching and removing the hose holder can be improved.

As an alternative of the construction of the clamping mechanism 153, for example, the movable clamp arm 155 and the operation member 157 may be connected by a feeding mechanism using a feed screw and a nut. In this case, the movable clamp arm 155 is rectilinearly moved by turning the operation member 157, so that the arm 123 is clamped by the movable clamp arm 155 and the fixed clamp arm 154.

Figure 14:
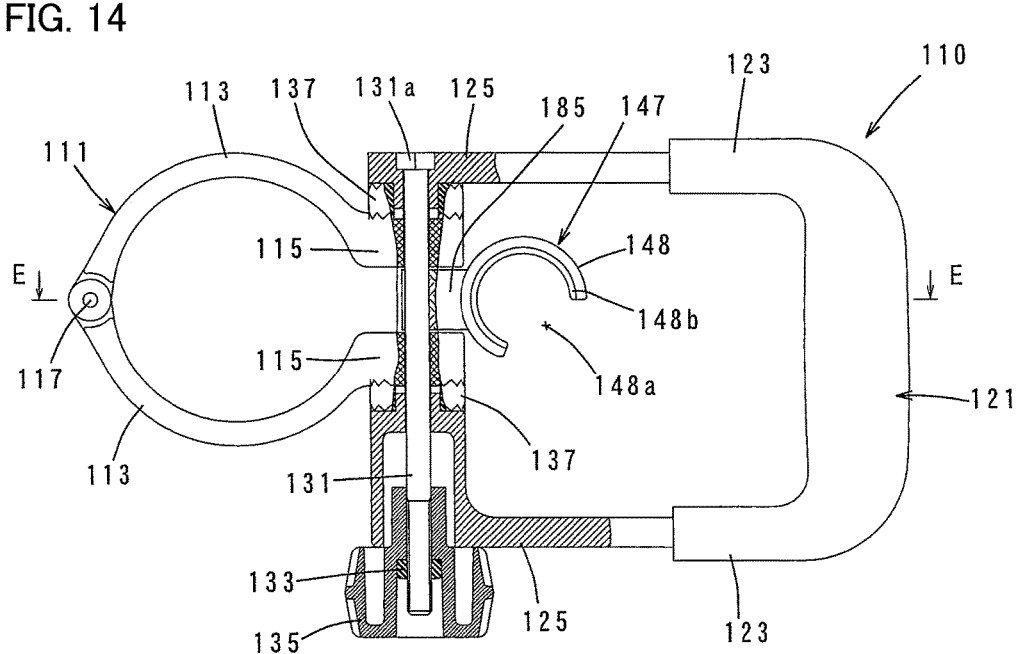
FIG. 14 is a partially sectional view showing another modification of a structure of mounting the dust collecting device or particularly the hose holder to the side handle.
Figure 15:
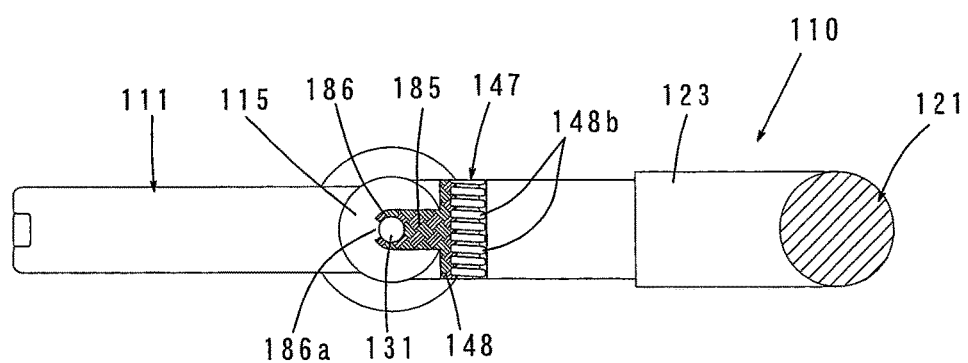
FIG. 15 is a sectional view taken along line E-E in FIG. 14.
Figure 16:
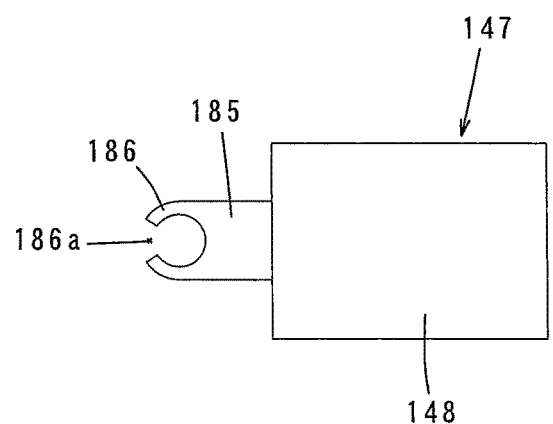
FIG. 16 is a top view showing the hose holder.

Now, a modification shown in FIGS. 14 to 16 is explained. In this modification, the hose holder 147 is mounted by the through bolt 131 between the bases 115 of the pair ring components 113 forming the mounting ring 111 of the side handle 110. In the other points, the entire construction of the dust collecting device 140 is generally the same as in the above-described first embodiment, and only part of the dust collecting device 140 or the hose holder 147 is shown in FIGS. 14 to 16.

The hose holder 147 mainly includes a hose holder body 148 for holding the dust collecting hose 146 and a projection 185 integrally formed on the outer surface of the hose holder body 148. The hose holder body 148 is a generally circular ring-like member having a hose attachment/removal opening 148a. A plurality of circumferentially extending rib-like projections 148b are formed on the inner circumferential surface of the hose holder body 148 and can engage with valleys of the bellows-like part 146a of the dust collecting hose 146. As shown in FIG. 16, the projection 185 protrudes in a radial direction of the hose holder body 148. A semicircular cylindrical part 186 is formed on the protruding end of the projection 185 and can engage with the shank of the through bolt 131. The semicircular cylindrical part 186 has an insertion opening 186a in part in the circumferential direction.

As for the side handle 110, as shown in FIG. 14, when the mounting ring 111 is clamped to the barrel 107 of the body 103, it has a predetermined clearance (distance) between the bases 115 of the pair ring components 113 which is large enough to receive the semicircular cylindrical part 186 of the projection 185. Therefore, in order to mount the hose holder 147 onto the through bolt 131, the insertion opening 186a of the semicircular cylindrical part 186 is pressed from the radial direction against the shank of the through bolt 131 through the clearance between the bases 115, and the semicircular cylindrical part 186 is fitted onto the shank by utilizing elastic deformation of the semicircular cylindrical part 186. Further, in order to remove the hose holder 147 from the shank, the semicircular cylindrical part 186 is pulled in a direction opposite to the pressing direction.

As described above, according to this modification in which the hose holder 147 can be mounted onto the through bolt 131 of the side handle 110, like in the first embodiment, the dust collecting device 140 can be attached via the side handle 110 to the electric hammer 101 having no mounting part for the dust collecting device 140.

Further, according to this modification, when the side handle 110 is mounted by clamping the mounting ring 111 to the barrel 107, the clearance between the opposed upper and lower bases 115 is slightly longer than the axial length of the semicircular cylindrical part 186. Therefore, the side handle 110 can be left mounted to the barrel 107 while fitting and removing the semicircular cylindrical part 186 with respect to the shank of the through bolt 131.

Further, it may be constructed such that the clearance between the opposed upper and lower bases 115 is generally equal to the axial length of the semicircular cylindrical part 186, and such that the projection 185 is fastened between the upper and lower bases 115 when the mounting ring 111 is clamped onto the barrel 107 with the through bolt 131 and the nut 133.

Figure 17:
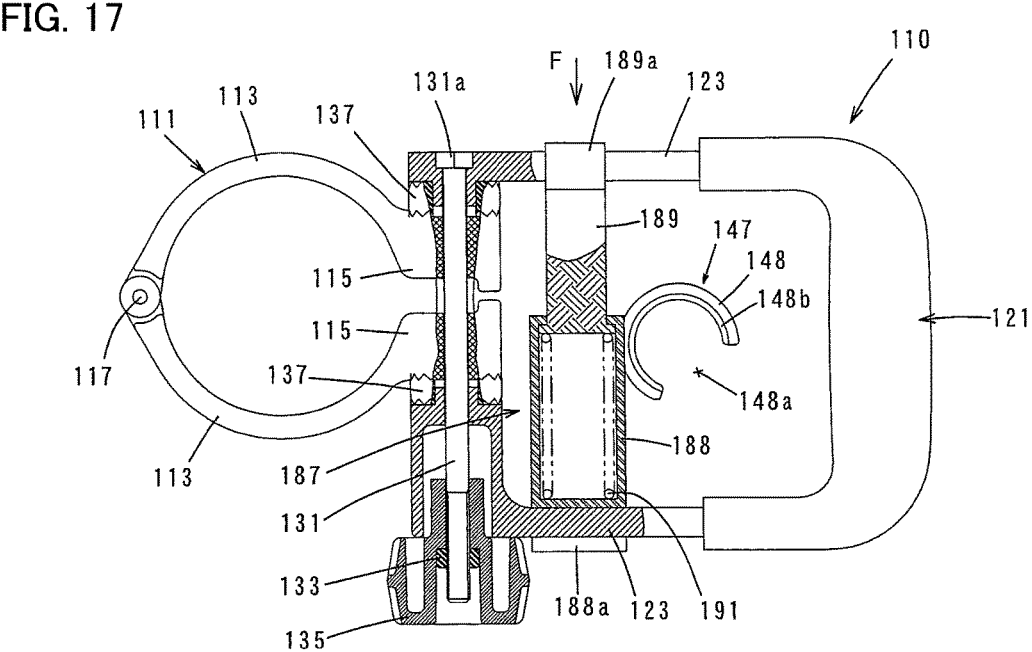
FIG. 17 is a partially sectional view showing a further modification of a structure of mounting the dust collecting device or particularly the hose holder to the side handle.
Figure 18:
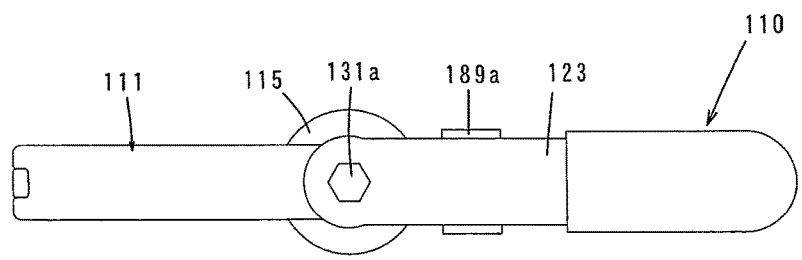
FIG. 18 is a view in the direction of arrow F in FIG. 17.
Figure 19:
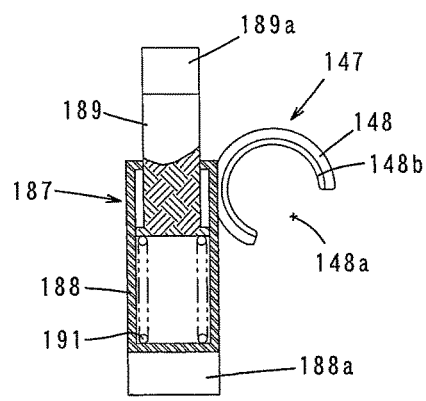
FIG. 19 is a partially sectional view showing a mounting member for the hose holder.

Now, a modification shown in FIGS. 17 to 19 is explained. In this modification, the hose holder 147 is mounted by utilizing the upper and lower arms 123 of the side handle 110. In the other points, the entire construction of the dust collecting device 140 is generally the same as in the above-described first embodiment, and only part of the dust collecting device 140 or the hose holder 147 is shown in FIGS. 17 to 19.

As shown in FIG. 19, the hose holder 147 mainly includes a hose holder body 148 for holding the dust collecting hose 146 and a telescopic tension member 187 connected to the hose holder body 148. The tension member 187 is a feature that corresponds to the "mounting member" according to this invention. The hose holder body 148 is a generally circular ring-like member having a hose attachment/removal opening 148*a*. A plurality of circumferentially extending rib-like projections 148*b* are formed on the inner circumferential surface of the hose holder body 148 and can engage with valleys of the bellows-like part 146*a* of the dust collecting hose 146.

The tension member 187 includes a cylindrical first rod-like member 188, a second rod-like member 189 which is slidably inserted into the first rod-like member 188, and a biasing member in the form of a compression coil spring 191 which is disposed within the first rod-like member 188 and biases the second rod-like member 189 in a direction (extending direction) in which that the second rod-like member 189 protrudes out of the first rod-like member 188. Two-pronged engagement recesses 188*a*, 189*a* are formed in the ends of the first and second rod-like members 188, 189 in the extending direction and can engage with the arms 123.

In the hose holder 147 according to this modification, the tension member 187 can be shortened by applying external force to the first and second rod-like members 188, 189 inwardly toward each other against the biasing force of the compression coil spring 191. In order to mount the hose holder 147 to the side handle 110, in this shortened state, the tension member 187 is placed between the upper and lower arms 123 and then the external force is released, so that the tension member 187 extends by the biasing force of the compression coil spring 191. At this time, for example, the engagement recess 188*a* of the first rod-like member 188 is engaged with the lower arm 123, and the engagement recess 189*a* of the second rod-like member 189 is engaged with the upper arm 123.

As described above, according to this modification in which the hose holder 147 can be mounted to the side handle 110 between the upper and lower arms 123 via the tension member 187, like in the first embodiment, the dust collecting device 140 can be attached via the side handle 110 to the electric hammer 101 having no mounting part for the dust collecting device 140. Further, by provision of the mounting structure using the tension member 187, the side handle 110 can be left mounted to the barrel 107 while mounting and removing the hose holder 147 with respect to the side handle 110.

Further, although, in the above-described modification, the tension member 187 is constructed to secure the hose holder 147 to the side handle 110 under tension by the biasing force of the compression coil spring 191, a threaded structure may also be used for this purpose under tension.

Figure 20:
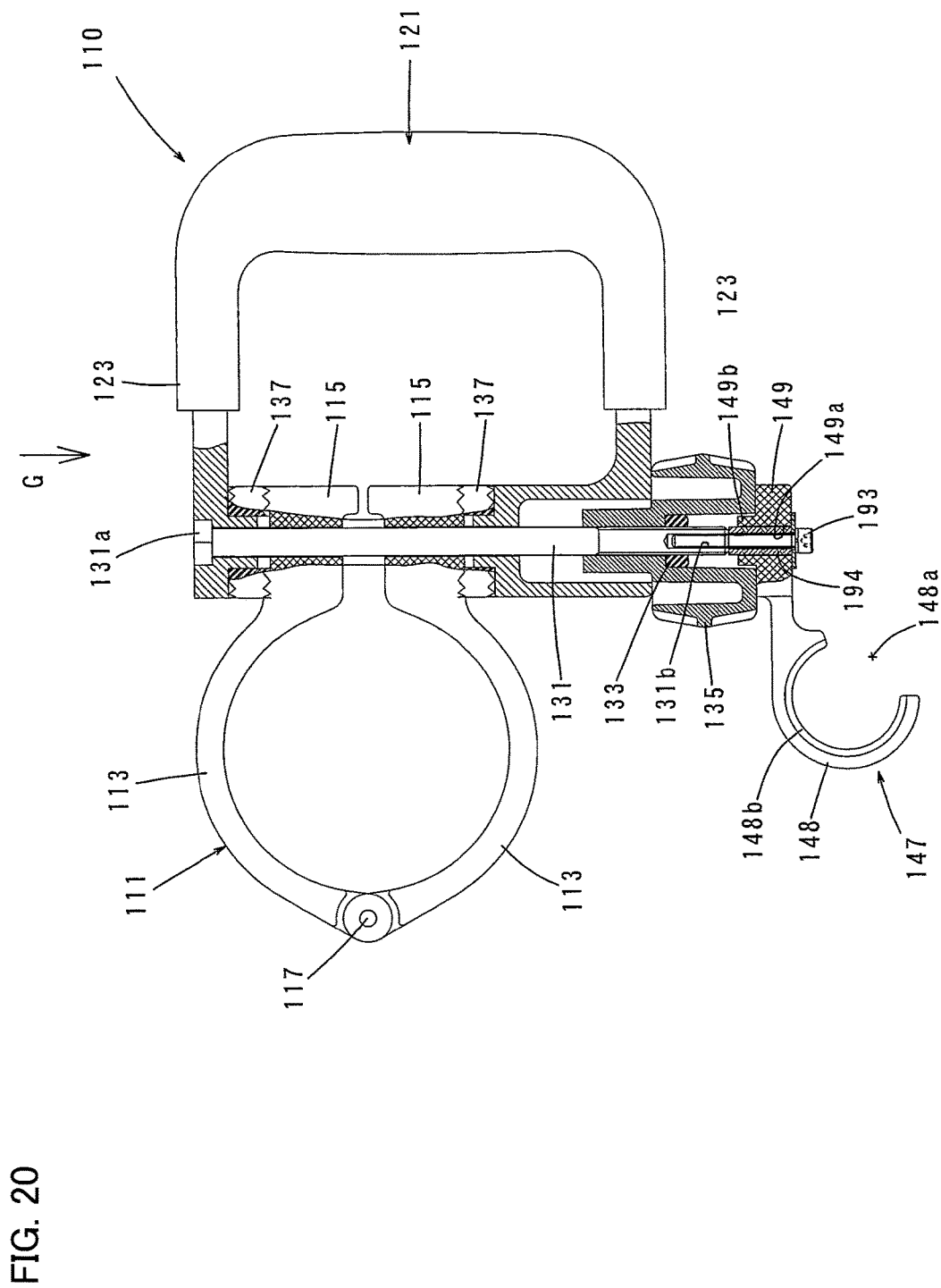
FIG. 20 is a partially sectional view showing a further modification of a structure of mounting the dust collecting device or particularly the hose holder to the side handle.

Now, a modification shown in FIG. 20 is explained. In this modification, the hose holder 147 is mounted to one axial end of the through bolt 131 by using a mounting screw 193. In the other points, the entire construction of the dust collecting device 140 is generally the same as in the above-described first embodiment, and only part of the dust collecting device 140 or the hose holder 147 is shown in FIG. 20.

Like in the first embodiment, the hose holder 147 of this modification includes a generally circular ring-like hose holder body 148 and a plate-like mounting base 149 extending from the hose holder body 148. The hose holder body 148 has a hose attachment/removal opening 148*a*, and a plurality of rib-like projections 148*b* are formed on the inner circumferential surface of the hose holder body 148 and can engage with valleys of the bellows-like part 146*a* of the dust collecting hose 146. The mounting base 149 has a through hole 149*a* extending therethrough in a direction transverse to its extending direction and a boss 149*b* formed coaxially with the through hole 149*a* on one side (surface of contact with the fastening knob 135). An axially extending threaded hole 131*b* is formed in one end of the through bolt 131 (on the fastening knob 135 side with the nut 133).

Therefore, in order to fasten the hose holder 147 to the side handle 110, the boss 149*b* of the mounting base 149 is inserted in a nut receiving recess formed in the fastening knob 135. Then a mounting screw 193 is inserted through the through hole 149*a* via a sleeve 194 and threadingly engaged with the threaded hole 131*b* of the through bolt 131.

As described above, according to this modification in which the hose holder 147 is mounted to the through bolt 131 of the side handle 110 by the mounting screw 193, like in the first embodiment, the dust collecting device 140 can be mounted via the side handle 110 to the electric hammer 101 having no mounting part for the dust collecting device 140. Further, this modification can be realized by a slight structural change or simply by forming the screw hole 131*b* in the through bolt 131.

Second Embodiment of the Invention

Figure 21:
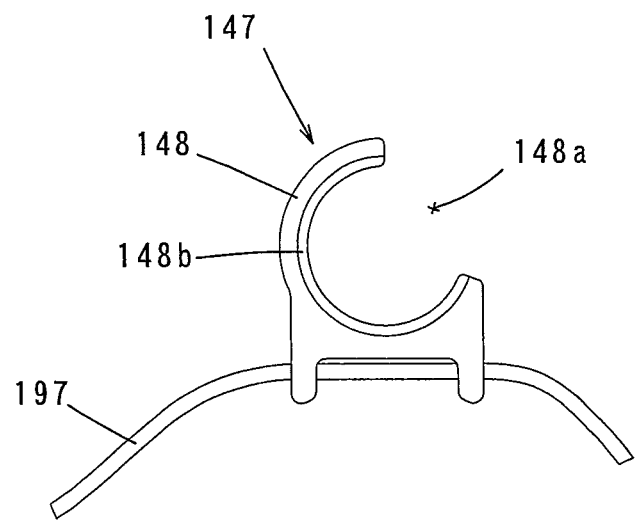
FIG. 21 is a front view illustrating a structure of mounting the dust collecting device or particularly the hose holder to the body of the electric hammer, according to a second embodiment of the present invention.
Figure 22:
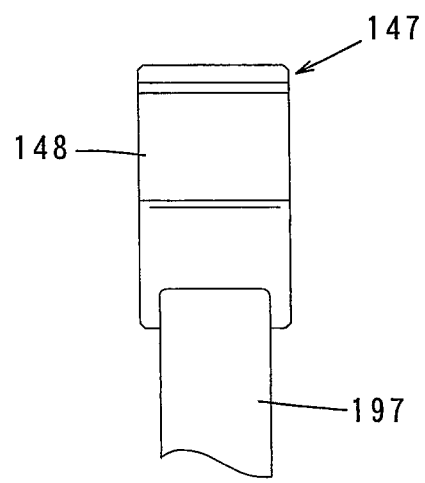
FIG. 22 is a side view thereof.

A second embodiment of the present invention relating to a structure of mounting the dust collecting device 140 to the electric hammer 101 is now described with reference to FIGS. 21 and 22. According to this embodiment, a flexible band-like member 197 such as a belt, a tape and a band is used to attach the dust collecting device 140 to the body 103 of the hammer 101 by wrapping around the body 103. The band-like member 197 is a feature that corresponds to the "wrapping member" according to this invention. The entire construction of the dust collecting device 140 is generally the same as in the above-described first embodiment, and only part of the dust collecting device 140 or the hose holder 147 is shown in FIGS. 21 and 22.

The hose holder 147 of the dust collecting device 140 according to this embodiment is constructed such that the band-like member 197 is passed through a wide hole formed in the base of the hose holder 148. Therefore, the hose holder 147 can be fixedly mounted to the body 103 by wrapping the band-like member 197 around the body 103, specifically around the axis of the barrel 107. As a result, the dust collecting hose 146 of the dust collecting device 140 can be held by the hose holder 147. Therefore, like in the above-described first embodiment, even if the hammer 101 is not provided with a mounting part for the dust collecting device 140, the dust collecting device 140 can be attached to the hammer 101. Further, when the band-like member 197 is wrapped around the barrel 107, the hose holder 147 can be set at any position around the axis of the hammer bit 119. Therefore, it can be positioned to avoid the dust collecting hose 146 from interfering with the operation.

The band-like member 197 typically has a structure of fastening by a hook and loop fastener. The means for fastening the band-like member 197 however is not limited to the hook and loop fastener, but various other methods can be appropriately used. For example, the fastening methods include a method of fastening by inserting a pin through a belt hole, a method of buckling the belt by a fastener or a so-called buckle, and a method of fastening by looping the belt back through a rectangular ring and tightening the belt.

The band-like member 197 may be wrapped around the barrel 107 forward or rearward of the side handle 110, or it may be wrapped around the mounting region for the side handle 110 provided that the side handle 110 is removed.

The wrapping member is not limited to the band-like member 197, but it may be a flexible string-like member such as a rope and a chain (e.g. a ball chain formed by coupling a number of balls). Further, the wrapping member may be formed by a pair of semicircular plates similar to the mounting ring 111 of the side handle 110, or it may be formed by an elastically deformable ring member having a cut in part in the circumferential direction.

Further, in the above-described embodiments, the electric hammer in which the hammer bit 119 performs only hammering movement in the axial direction is explained as a representative example of the impact tool according to the present invention, but the present invention can also be applied to a hammer drill which can switch between hammering mode in which the hammer bit 119 performs hammering movement and hammer drill mode in which it performs hammering movement in the axial direction and hammer drill movement in the circumferential direction.

In view of the scope and spirit of the above-described invention, the following features can be provided.

(1)

"A dust collecting device that is attached to an impact tool and collects dust generated by the impact tool which includes a tool body and an auxiliary handle removably mounted to the tool body and in which a tool bit coupled to a front end region of the tool body is caused to rectilinearly move in an axial direction of the tool bit, comprising:

a dust collecting part having a dust suction port at its front end, a dust collecting hose which is connected to the dust collecting part and through which dust is transferred downstream, and a hose holding part for holding the dust collecting hose while the dust collecting hose is locked against axial movement, wherein the hose holding part can be mounted to and removed from the auxiliary handle, so that the dust collecting device can be attached to the impact tool which is not provided with a mounting part for the dust collecting device."

(2)

"The dust collecting device as defined in claim 1, wherein the auxiliary handle includes an elongate grip, and an arm extending from the grip in a direction transverse to a longitudinal direction of the grip, and wherein the hose holding part is mounted to the auxiliary handle by a clamping mechanism which is fastened to the auxiliary handle by clamping the arm from above and below."

DESCRIPTION OF NUMERALS 101 electric hammer (impact tool)
103 body
105 housing
107 barrel
108 chuck
109 handgrip (main handle)
110 side handle (auxiliary handle)
111 mounting ring
113 ring component
115 base
117 shaft
119 hammer bit (tool bit)
119a bit tip
119b shank
121 grip
123 arm
125 extending end portion
131 through bolt
131a head
133 nut
135 fastening knob
137 cam
140 dust collecting device
141 dust collecting hood (dust collecting part)
141a dust suction port
141b internal space
141c through hole
143 cylindrical sliding member
144 hose connecting part
144a passage
145 partition
146 dust collecting hose (dust transfer part)
146a bellows-like part
147 hose holder (hose holding part)
148 hose holder body
148a hose attachment/removal opening
148b projection
149 mounting base
151 notch
152 recessed engagement part
153 clamping mechanism
154 fixed clamp arm
154a clamp face
154b clamp part
154c arm guide
155 movable clamp arm
155a clamp face
155b guide rod
156 compression coil spring
157 operation member
158 screw
161 hose holder (hose holding part)
162 hose holder body
162a opening
163 mounting base
164 locking member
164a protruding end
164b locking projection
164c stopper
165 pin
166 compression coil spring
185 projection
186 semicircular cylindrical part
186a insertion opening
187 tension member (mounting member)

188 first rod-like member
188a engagement recess
189 second rod-like member
189a engagement recess
191 compression coil spring (biasing member)
193 mounting screw
197 band-like member (wrapping member)

The invention claimed is:

1. A dust collecting device that is adapted to be attached to an impact tool and is adapted to collect dust generated by the impact tool in which a tool bit detachably coupled to a front end region of a tool body is caused to rectilinearly move in an axial direction of the tool bit, comprising:
   a dust collecting part having a dust suction port through which dust is sucked up,
   a dust collecting hose which is connected to the dust collecting part and through which dust is transferred downstream, and
   a hose holding part for holding the dust collecting hose, wherein:
      the hose holding part can be mounted to the tool body by a wrapping member which is detachably wrapped around the tool body,
      the hose holding part comprises a holder body,
      the dust collecting hose comprises a tubular member made of rubber or resin and has a bellows-like part formed at least in part of the dust collecting hose, and
      the dust collecting hose is held by the hose holding part by engagement between rib-like projections of the hose holder body and valleys of the bellows-like part of the dust collecting hose.

2. The dust collecting device as defined in claim 1, wherein the dust collecting part is adapted to be arranged to surround the tool bit entirely around an axis of the tool bit.

3. The dust collecting device as defined in claim 2, wherein the dust collecting part is adapted to be held on a shank of the tool bit so as to be allowed to move in the axial direction of the tool bit.

4. The dust collecting device as defined in claim 1, wherein the wrapping member is formed as a flexible band-like member.

5. The dust collecting device as defined in claim 4, wherein the band-like member has a hook and loop fastener for fastening.

6. The dust collecting device as defined in claim 4, wherein the band-like member has a belt hole into which a pin is inserted for fastening.

7. The dust collecting device as defined in claim 4, wherein the band-like member has a buckle for fastening.

8. The dust collecting device as defined in claim 1, wherein the hose holding part is formed as a generally circular ring-like member having a hose attachment/removal opening.

9. An impact tool having the dust collecting device as defined in claim 1.

10. The impact tool as defined in claim 9, comprising:
    a motor, and
    a tool body which houses a motor, the tool body including a housing and a cylindrical barrel which is connected to the front of the housing,
    wherein the hose holding part is mounted to the tool body by the wrapping member which is detachably wrapped around the barrel.

* * * * *